United States Patent
Bloom et al.

(10) Patent No.: US 8,627,482 B2
(45) Date of Patent: Jan. 7, 2014

(54) METHOD, APPARATUS AND SYSTEM FOR SECURE DISTRIBUTION OF CONTENT

(75) Inventors: Jeffrey Adam Bloom, West Windsor, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1125 days.

(21) Appl. No.: 12/309,568

(22) PCT Filed: Dec. 13, 2006

(86) PCT No.: PCT/US2006/047634
§ 371 (c)(1),
(2), (4) Date: Jan. 23, 2009

(87) PCT Pub. No.: WO2008/013562
PCT Pub. Date: Jan. 31, 2008

(65) Prior Publication Data
US 2009/0290711 A1 Nov. 26, 2009

Related U.S. Application Data

(60) Provisional application No. 60/832,830, filed on Jul. 24, 2006.

(51) Int. Cl.
*G06F 21/00* (2013.01)
(52) U.S. Cl.
USPC .................. 726/26; 726/3; 726/22; 713/171; 713/189; 380/37; 380/277
(58) Field of Classification Search
USPC ...................... 380/239, 259; 726/26
See application file for complete search history.

(56) References Cited

U.S. PATENT DOCUMENTS

| 6,118,873 | A  | * | 9/2000 | Lotspiech et al. | |
|---|---|---|---|---|---|
| 6,789,188 | B1 | | 9/2004 | Epstein et al. | |
| 6,993,137 | B2 | | 1/2006 | Fransdonk | |
| 7,062,658 | B1 | * | 6/2006 | Cheriton et al. | 713/189 |

(Continued)

FOREIGN PATENT DOCUMENTS

| JP | 2003-8566 | 1/2003 |
|---|---|---|
| JP | 2005-513835 | 5/2005 |

(Continued)

OTHER PUBLICATIONS

Andreaux, et al., "Copy Protection System for Digital Home Networks", IEEE Signal Processing Magazine, 1053-5888/04, Mar. 2004, p. 100-108.

(Continued)

*Primary Examiner* — Morshed Mehedi
(74) *Attorney, Agent, or Firm* — Robert D. Shedd; Jorge Tony Villabon

(57) ABSTRACT

The invention provides a method, apparatus and system for the secure distribution of content such as audiovisual content in a way that prevents users from misusing the content and provides a mechanism for tracking pirated material back to the original location of misappropriation. A security device incorporates encryption methods to insure the broadcast encryption key remains secure. A marking device incorporates, for example, digital watermarking methods that attach to the content information to identify a location of origin of the misappropriation, such as a Set-top Box (STB) and/or smart card.

13 Claims, 5 Drawing Sheets

(56) References Cited

U.S. PATENT DOCUMENTS

| | | |
|---|---|---|
| 7,107,462 B2 | 9/2006 | Fransdonk |
| 7,181,620 B1 * | 2/2007 | Hur .............................. 713/171 |
| 7,242,766 B1 * | 7/2007 | Lyle .................................. 380/2 |
| 7,529,375 B2 | 5/2009 | Durand |
| 7,584,361 B2 | 9/2009 | Tapson |
| 2001/0051996 A1 | 12/2001 | Cooper et al. |
| 2002/0176572 A1 * | 11/2002 | Ananth ........................ 380/37 |
| 2003/0108206 A1 | 6/2003 | Diehl et al. |
| 2005/0013437 A1 * | 1/2005 | Ikonen et al. ................. 380/241 |
| 2005/0195980 A1 * | 9/2005 | Lotspiech et al. ............ 380/277 |
| 2005/0198529 A1 * | 9/2005 | Kitani .......................... 713/200 |
| 2006/0107045 A1 * | 5/2006 | Le Buhan et al. ............ 713/168 |
| 2006/0136718 A1 | 6/2006 | Moreillon |
| 2006/0193474 A1 * | 8/2006 | Fransdonk ................... 380/279 |
| 2007/0022469 A1 * | 1/2007 | Cooper et al. .................... 726/3 |

FOREIGN PATENT DOCUMENTS

| | | |
|---|---|---|
| JP | 2005-522902 | 7/2005 |
| JP | 2005-210687 | 8/2005 |
| WO | 03/052598 A1 | 6/2003 |
| WO | WO03058618 | 7/2003 |
| WO | WO2006/062635 | 6/2006 |

OTHER PUBLICATIONS

EBU Project Group B/CA, "Functional model of a conditional access system," EBU Technical Review, European Broadcasting Union, Brussels. BE, No. 266, Dec. 21, 1995, pp. 64-77, XP000559450.

Guillou et al., Encipherment and Conditional Access, SMPTE Journal, SMPTE Inc., Scarsdale, NY, US, vol. 103, No. 6, Jun. 1, 1994, pp. 398-406, XP000457575.

Judge et al., WHIM: watermarking multicast video with a hierarchy of intermediaries, Computer Networks, Elsevier Science Publishers B.V., Amsterdam, NL, vol. 39, No. 6, Aug. 21, 2002, pp. 699-712. XP004371479.

International Search Report, dated Jun. 29, 2007.

* cited by examiner

METHOD, APPARATUS AND SYSTEM FOR SECURE DISTRIBUTION OF CONTENT

This application claims the benefit, under 35 U.S.C. §365 of International Application PCT/US2006/476348, filed on Dec. 13, 2006, which was published in accordance with PCT Article 21(2) on Jan. 31, 2008, in English and which claims the benefit of U.S. provisional patent application No. 60/832,830, filed on Jul. 24, 2006.

FIELD OF THE INVENTION

The present invention generally relates to content distribution and, more particularly, to a method, apparatus and system for securely communicating content such as audiovisual content.

BACKGROUND OF THE INVENTION

Content such as audiovisual content, securely stored within a content device, such as a Set-top Box (STB), is often transferred over an unsecured channel (e.g., a home network), to a software player running on, for example, a personal computer (PC). The STB uses a sophisticated conditional access (CA) mechanism to prevent the unauthorized use of the content, however, pirating can easily take place along the unsecured channel.

As such, what is needed is a method, apparatus and system for the secure distribution of audiovisual content.

SUMMARY OF THE INVENTION

Embodiments of the present invention address these and other deficiencies of the prior art by providing a method, apparatus and system for the secure distribution of content, such as audiovisual content.

In one embodiment of the present invention, a method for the secure distribution of content includes encrypting the content using a first key, encrypting the first key using a second key, and distributing the encrypted content and the encrypted first key. In such an embodiment of the present invention, the distributed content is decrypted by decrypting the first key using a locally stored copy of the second key and decrypting the content using the decrypted first key. The method can further include the inclusion of identification information intended to identify the original intended user of misappropriated content. That is, the method can further include marking the decrypted content for identification purposes, and re-encrypting the marked content. In addition, the method can further include encrypting the content using a third key, the third key being acquired via a secure channel and communicating the content encrypted using the third key to a source of the third key, wherein the content encrypted using the third key is decrypted using a local copy of the third key.

In an alternate embodiment of the present invention, an apparatus for the secure distribution of content includes a secure processing module for encrypting and decrypting the content and a smart card for locally storing and decrypting encryption keys. In the apparatus, upon receiving content encrypted with a first key and upon receiving the first key encrypted with a second key, the smart card of the apparatus decrypts the first key using a locally stored copy of the second key, and the secure processing module decrypts the received encrypted content using the decrypted first key. The apparatus of the present invention can further include a marking module for marking the decrypted content.

In an alternate embodiment of the present invention, a system for the secure distribution of content includes a content source for distributing content, an electronic countermeasure device for encrypting the distributed content using a first key and for encrypting the first key using a second key, an apparatus for receiving the content encrypted with a first key and the first key encrypted with a second key and a storage device for storing the received encrypted content and the first key. The apparatus of the system can include a secure processing module for encrypting and decrypting content and a smart card for locally storing and decrypting encryption keys. In the system of the present invention, upon receiving content encrypted with the first key and upon receiving the first key encrypted with the second key, the smart card of the apparatus decrypts the first key using a locally stored copy of the second key, and the secure processing decrypts the received encrypted content using the decrypted first key. The apparatus of the system of the present invention can further include a marking module for marking the decrypted content. In addition, the system of the present invention can further include a content player for communicating a third key to the apparatus via a secure channel, wherein the apparatus encrypts the decrypted content using the third key and communicates the content encrypted using the third key to the content player and the content player decrypts the content encrypted via the third key using a locally stored copy of the third key.

BRIEF DESCRIPTION OF THE DRAWINGS

The teachings of the present invention can be readily understood by considering the following detailed description in conjunction with the accompanying drawings, in which.

Figure 1:
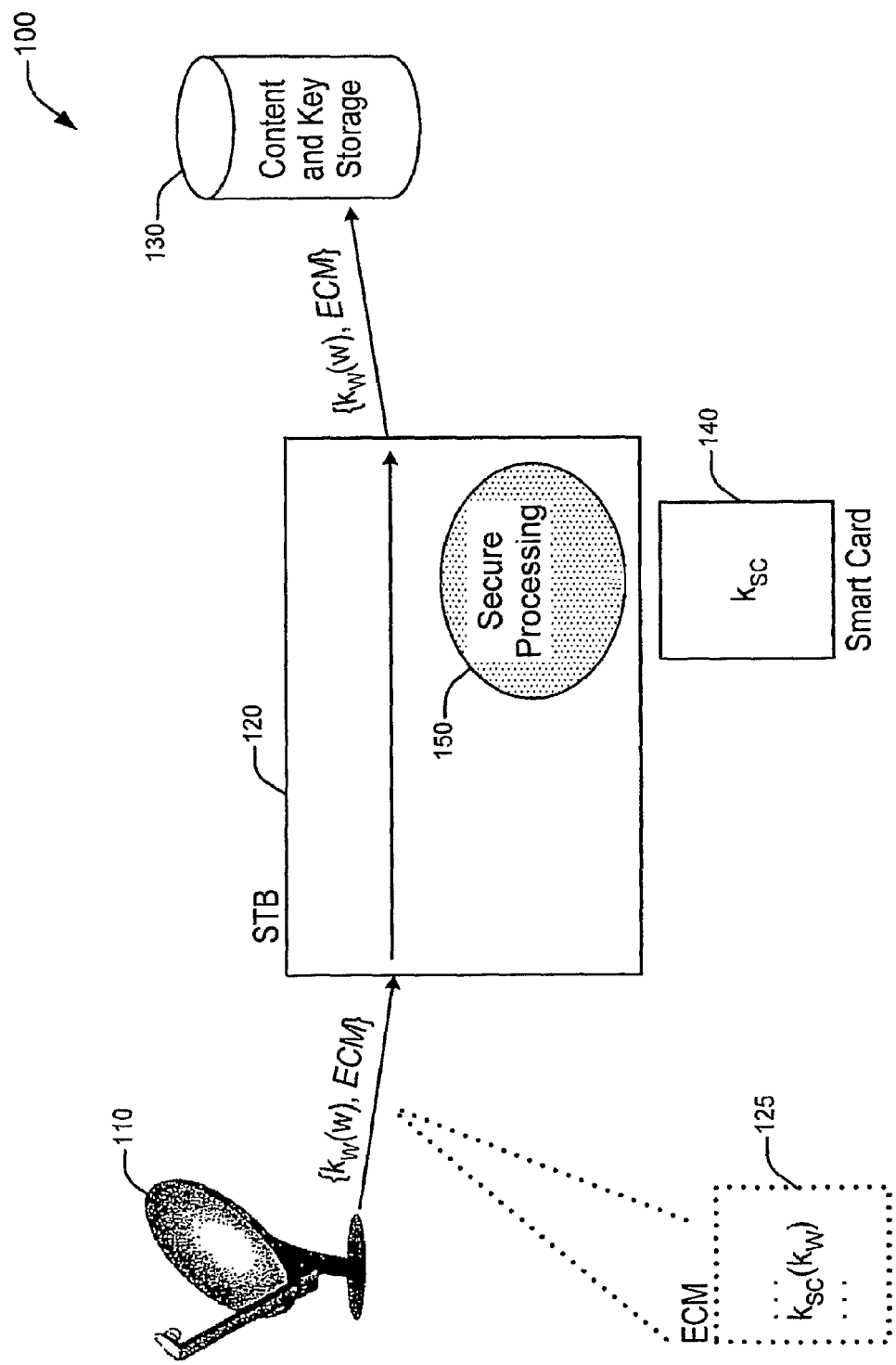
FIG. 1 depicts a high level block diagram of a system for adding security encryption to content in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for securely communicating content such as audiovisual content in, for example, a home network environment. Although the present invention will be described primarily within the context of audiovisual content in a home network environment including a software player, the specific embodiments of the present invention should not be treated as limiting the scope of the invention. It will be appreciated by those skilled in the art and informed by the teachings of the present invention that the concepts of the present invention can be advantageously applied in substantially any network for the secure transfer of any content (e.g., video, audio, audiovisual, etc.) to be played on substantially any content player.

FIG. 1 depicts a high level block diagram of a system for adding security encryption to content such as audiovisual content in accordance with an embodiment of the present invention. The system 100 of FIG. 1 illustratively comprises an audiovisual content transmission device (illustratively a satellite dish) 110, a Set-top Box 120, an Electronic Countermeasure device 125 and a content and key storage device 130. In the system 100 of FIG. 1, the Set-top Box 120 includes a smart card 140 and a secure processing and storage module 150. In the system 100 of FIG. 1, the module 150 of the Set-top Box has a secure communications link to the smart card 140. In addition, the smart card 140 has secure processing and storage capabilities.

In the system 100 of FIG. 1, an electronic counter-measure (ECM) message from the ECM device 125 is communicated to the STB 120 along with the audiovisual content. The ECM message contains, among other things, an encryption key or work key, $k_w$. To prevent interception, the work key, $k_w$, is encrypted with a key to be used by the smart card 140. The key is denoted herein as the smart card key, $k_{sc}$ and the encrypted work key as $k_{sc}(k_w)$. The smart card key is stored safely on the smart card 140 and cannot be recovered by someone attempting to intercept or copy the audiovisual content. In the embodiment of FIG. 1, the smart card key is a key to a symmetric key cipher. The encryption of the ECM message is not essential to the understanding of the embodiments of the invention presented herein and, as such, will not be described in detail herein. In one embodiment of the present invention, the encryption of the ECM message can be a public key cipher, however any known encryption methods can be applied.

As previously described, the ECM message is stored along with the encrypted audiovisual content in for example the content and key storage device 130. Upon playback of the audiovisual content, the ECM is recalled from storage 150 and the encrypted work key is communicated to the smart card 140. The smart card 140 uses a local copy of $k_{sc}$ to decrypt and return $k_w$ to the secure processing module 150 of the STB 120. As such, the STB 120 obtains the necessary key to decrypt the stored audiovisual content. Such decryption can be accomplished in the secure processing module 150. Although in the embodiment of the system of FIG. 1 the audiovisual content and ECM is depicted as being communicated to a single STB 120, in alternate embodiments of the present invention, the audiovisual content and ECM can be broadcast to more than one Set-top box or other receiving device for encryption and processing as described above. For example, each broadcast audiovisual content can be encrypted using a symmetric key cipher. As previously recited, the encryption key or audiovisual work key is herein denoted as $k_w$ and the encrypted audiovisual content as $k_w(w)$. The encrypted audiovisual content is received by each STB and stored for later use.

Figure 2:
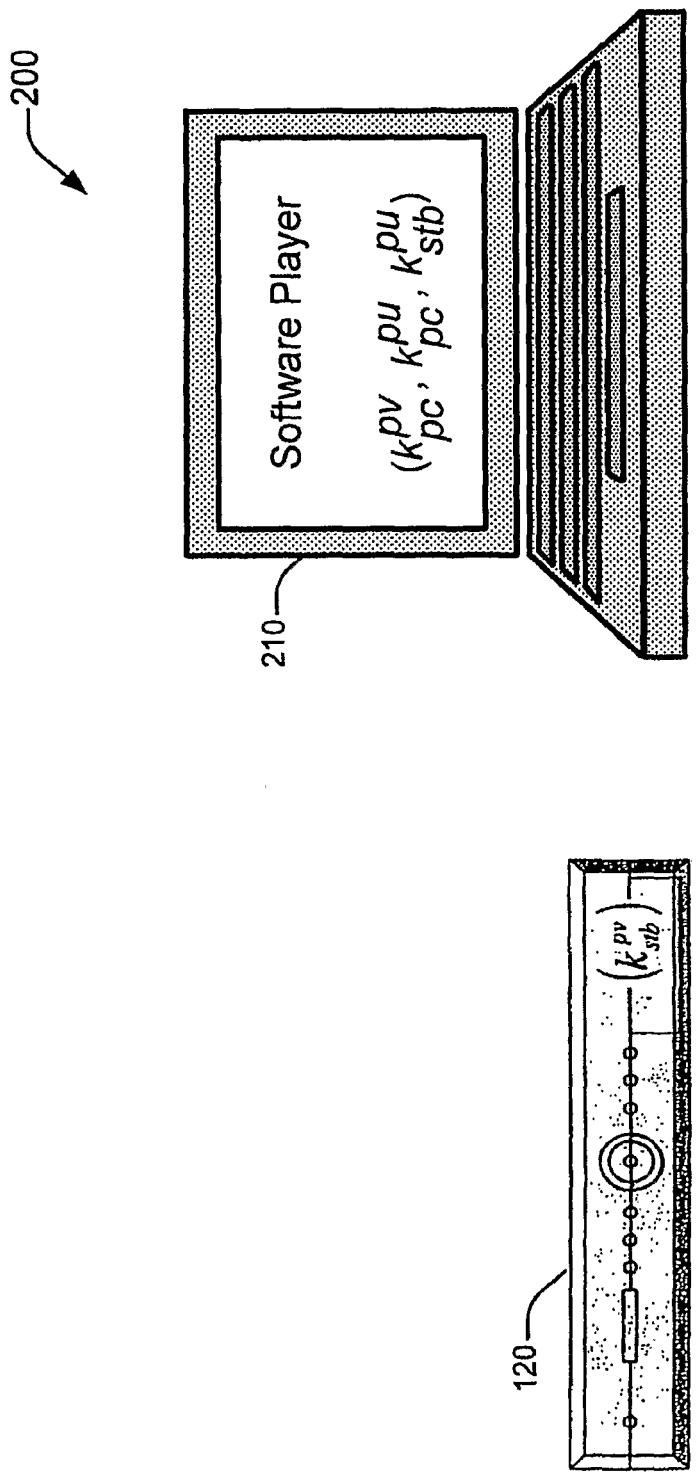
FIG. 2 depicts a high level block diagram of a system including a set-top box as depicted in FIG. 1 and a software player for receiving and playing the encrypted content of FIG. 1 in accordance with an embodiment of the present invention.

FIG. 2 depicts a high level block diagram of a set-top box 120 as depicted in FIG. 1 and a software player for receiving and playing the encrypted audiovisual content of FIG. 1 in accordance with an embodiment of the present invention. In FIG. 2, the software player illustratively comprises a personal computer (PC) 210. In content distribution systems, it is desirable to allow stored content, such as the audiovisual content stored in the STB 120 and/or the content and key storage device 130 of FIG. 1 as described above, to be transferred to a personal computer for display. In FIG. 2, the software player 210 is provided with a unique private/public key pair and the public key of the STB 120. The software player 210 encrypts its own public key with the STB public key and communicates this information to the STB. The STB can decrypt this message with its private key. As such, the two devices know each others public key and they can establish a secure communication channel. Through this channel they create and exchange a session key and then terminate the secure channel. The session key will be used to securely transfer the content from the STB to the software player.

More specifically, in one embodiment of the present invention, stored audiovisual content is communicated directly from STB storage to the PC 210. As such, the key, $k_w$, needs to be communicated to the PC 210 along with the audiovisual content. In the system of FIG. 2, the PC 210 is considered an unsecured platform and poses a risk to the security of the key, $k_w$, which before to the communication to the PC 210 was very secure.

To maintain the security of $k_w$, a link encryption is implemented. More specifically, the PC 210 and the STB 120 use a public key cipher to establish a secure communications channel, (e.g., a TLS). Public key ciphers, however, are computationally expensive and thus are not often used for large data payloads. Instead, this TLS channel is used to establish and exchange a session key, $k_s$, for a symmetric key cipher. The STB will then decrypt the audiovisual content using the work key, $k_w$, and then immediately encrypt it using the session key, $k_s$. This re-encrypted audiovisual content can then be securely communicated through an unsecured channel, for example a home network, to the PC 210 and decrypted there for display.

Figure 3:
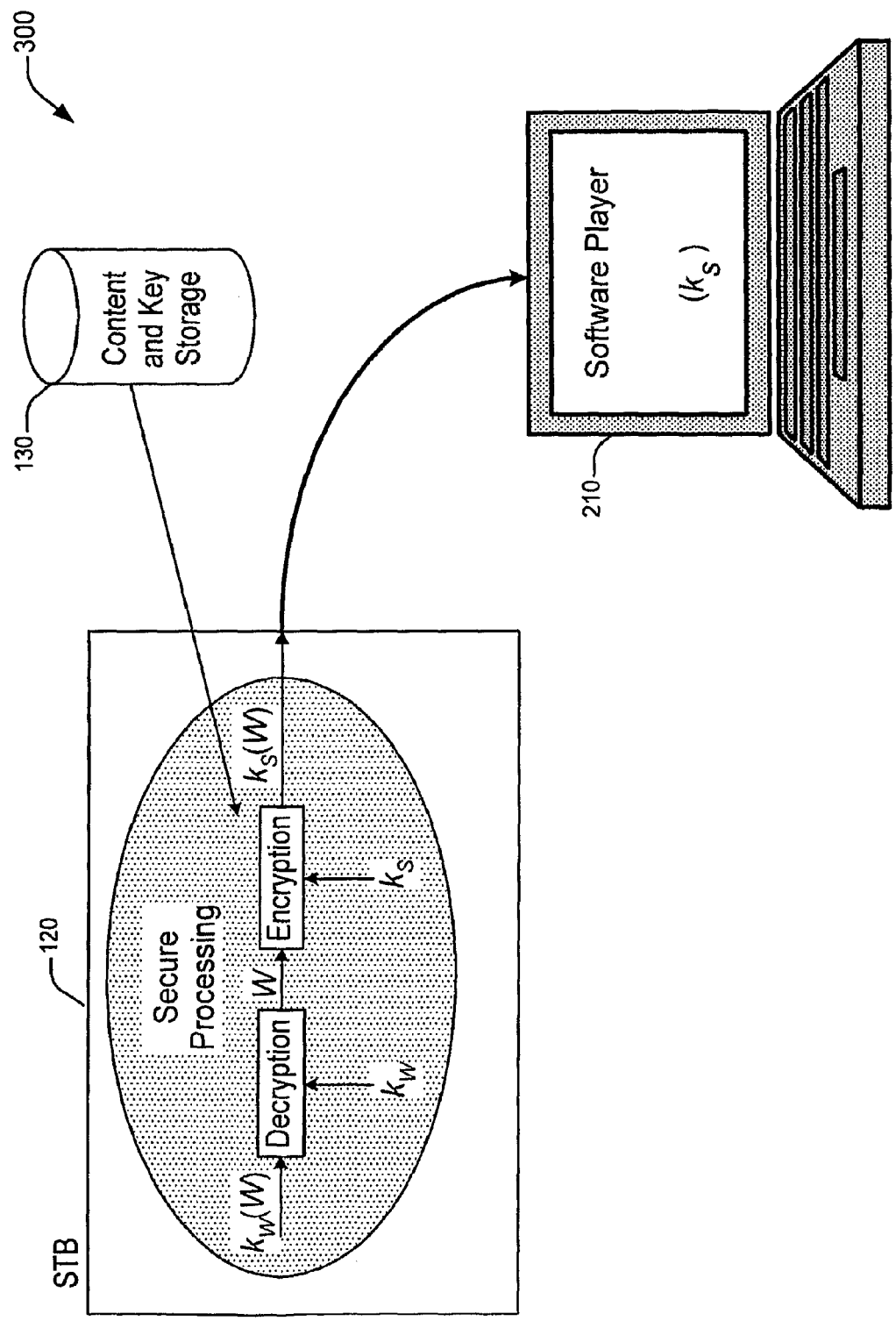
FIG. 3 depicts a high level block diagram of a content distribution system in accordance with an embodiment of the present invention.

For example, FIG. 3 depicts a high level block diagram of an audiovisual content distribution system in accordance with an embodiment of the present invention. The audiovisual content distribution system 300 of FIG. 3 illustratively includes a content and key storage device 130 and a Set-top Box (STB) 120 as depicted in FIG. 1 and a software player 210 as depicted in FIG. 2. In the system of FIG. 3, once a session key, $k_s$, has been established, the secure processing device 150 in the STB 120 is used to decrypt the work and re-encrypt it using the symmetric cipher session key, $k_s$. The encrypted content can then be communicated to the PC 210 on an unsecured channel, such as a home network. The player can decrypt the content with its copy of the session key, $k_s$.

In order to use a public key cipher, the STB 120 and the software running on the PC 210 must each have a public/private key pair. In one embodiment of the present invention, the private key of the STB 120, $k_{stb}^{pv}$, is embedded in the secure processing module 150 during manufacture and the public key, $k_{stb}^{pu}$, is stored in a secure database for subsequent distribution. The software player 210 can comprise a proprietary player distributed by a STB owner/operator to its customers upon request. Each copy of the software player 210 will contain a unique private/public key pair, ($k_{pc}^{pv}, k_{pc}^{pu}$). A customer request for audiovisual content will include the unique identification of an STB from which the connection is requested. The public key of that STB will be embedded into a respective software player ensuring that the software player can only work with that STB. This also gives an STB operator a record of which STBs have been enabled to communicate with which PCs.

As such and in accordance with the present invention, the STB 120 has a private key and the software player 210 will have the corresponding public key as well as its own private/public key pair. The software player 210 initiates a connection with the STB 120 over an unsecured channel, for example a home network, and can communicate to the STB 120 information regarding its public key. In such a manner, the STB 120 and the software player 210 are able to establish a secure channel through which they can establish and exchange a symmetric cipher session key as described above with reference to FIG. 2.

Many protocols for establishing a secure channel require that all communication devices have signed digital certificates from a trusted source. Given the proprietary nature of the proposed architecture, these certificates can be generated by, for example, the STB operator (the trusted source) and provided to both the STB 120 and the software player 210. This ensures that the STB 120 will only establish a secure link with an STB-operator authorized software player. The concepts of the present invention as described above will assist in protecting distributed audiovisual content from being pirated. In various embodiments of the present invention, advanced software security techniques are implemented to protect the software private key and derived session key from being discovered. Unfortunately however, knowledgeable pirates most likely will be successful in discovering these keys. Once discovered, the session key can be used to decrypt the audiovisual content. However, in accordance with an embodiment of the present invention, different audiovisual content will be encrypted with a different session key. As such, while a discovered key is valuable for decrypting corresponding protected audiovisual content on a corresponding STB, the discovered key will not be valuable to anyone else having a different STB nor would it be useful for decrypting other distributed audiovisual content. To do so, another session key would need to be discovered.

Even further, a software private key can be discovered and used to observe a TLS session, thus learning each session key as the session is established. For example, there can be two groups of individuals who might pursue such unauthorized copying: customers who which to make copies for themselves and their friends and professional thieves. One difference between these two groups is that the misbehaving customers obtain primary value from the content delivery service and only secondary value from the copying. Professional thieves take advantage of the content delivery service for the purpose of generating pirate content.

Digital watermarking is a technique for modifying digital imagery in order to attach certain identifiable metadata to audiovisual content. The metadata is recoverable from a copy of the watermarked content, even if that content has been re-compressed or has been converted to analog format. The digital watermark in content is also intended to survive the decryption, decoding, and digital-to-analog conversion of content that can be performed in a single secure silicon chip so that the only capturable, clear text content is analog. Such a process is commonly referred to as the "Analog Hole".

In various embodiments of the present invention, watermarking can be optionally applied to audiovisual content secured in accordance with the present invention. For example, in a first approach, received audiovisual content is not directly stored in a Set-top Box (STB). Instead, the content is decrypted, watermarked, and re-encrypted prior to storage. The watermark contains information that uniquely identifies the STB and the associated smart card and includes a timestamp indicating a receiving and recording time.

Figure 4:
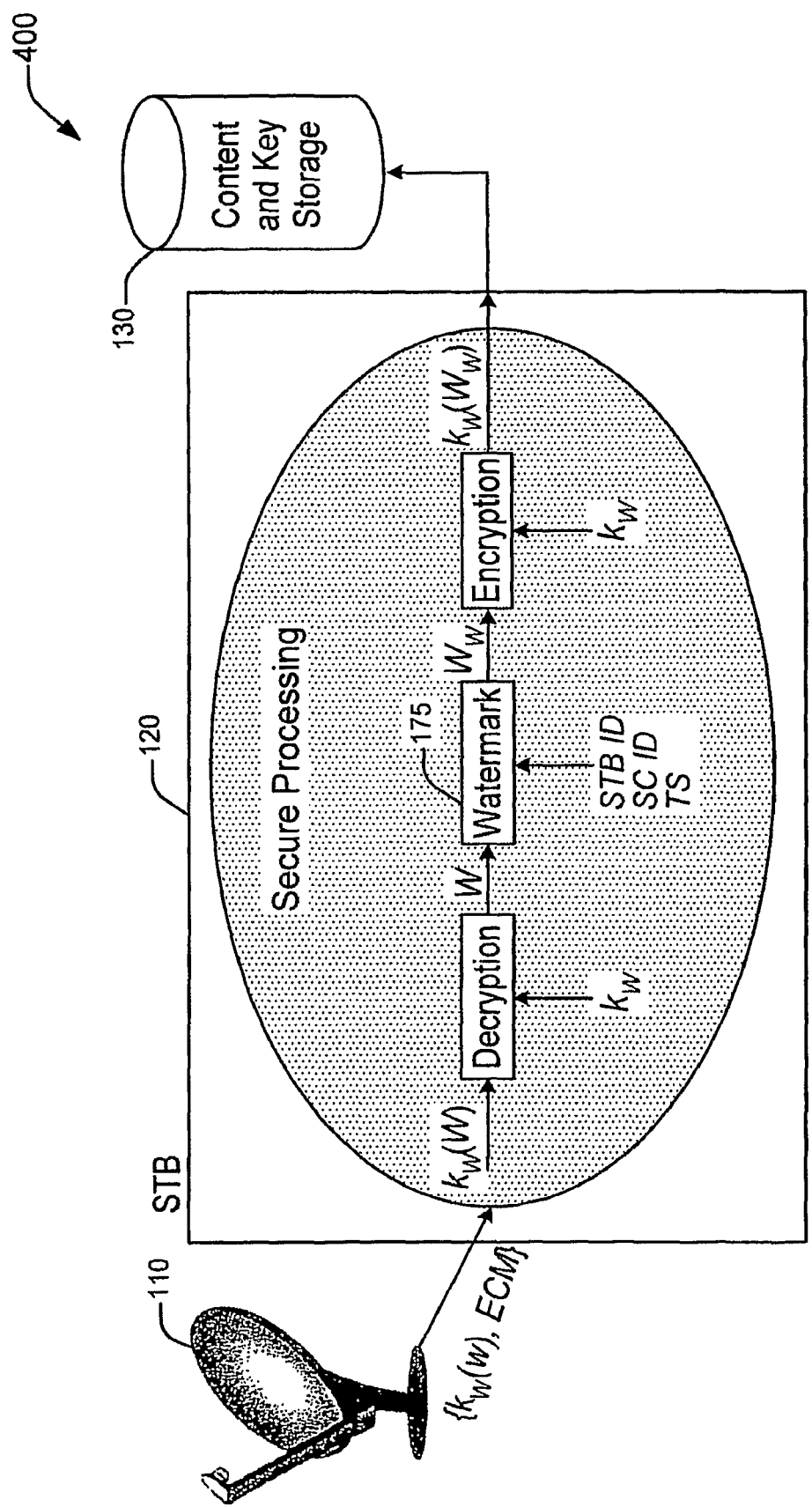
FIG. 4 depicts a high level block diagram of a content distribution and watermarking system in accordance with an embodiment of the present invention.

FIG. 4 depicts a high level block diagram of an audiovisual content distribution and watermarking system in accordance with an embodiment of the present invention. The system 400 of FIG. 4 illustratively includes a content transmission device (illustratively a satellite dish) 110, a content and key storage device 130 and a Set-top Box (STB) 120 as depicted in FIG. 1. However, in the system of FIG. 4, the STB 120 further comprises a watermarking module 175 for applying a watermark to the content received from the content transmission device 110 prior to storage in the content and key storage device 130.

In the system 400 of FIG. 4, if the security of the STB 120 is compromised and the content is successfully obtained from the STB 120 and is successfully pirated, the watermark applied by the watermarking module 175 will identify the offending STB/customer. The watermarking of the present invention, however, introduces an additional decryption/encryption cycle to the process and this, along with the watermarking, can become computationally expensive for real-time processing in the STB.

Figure 5:
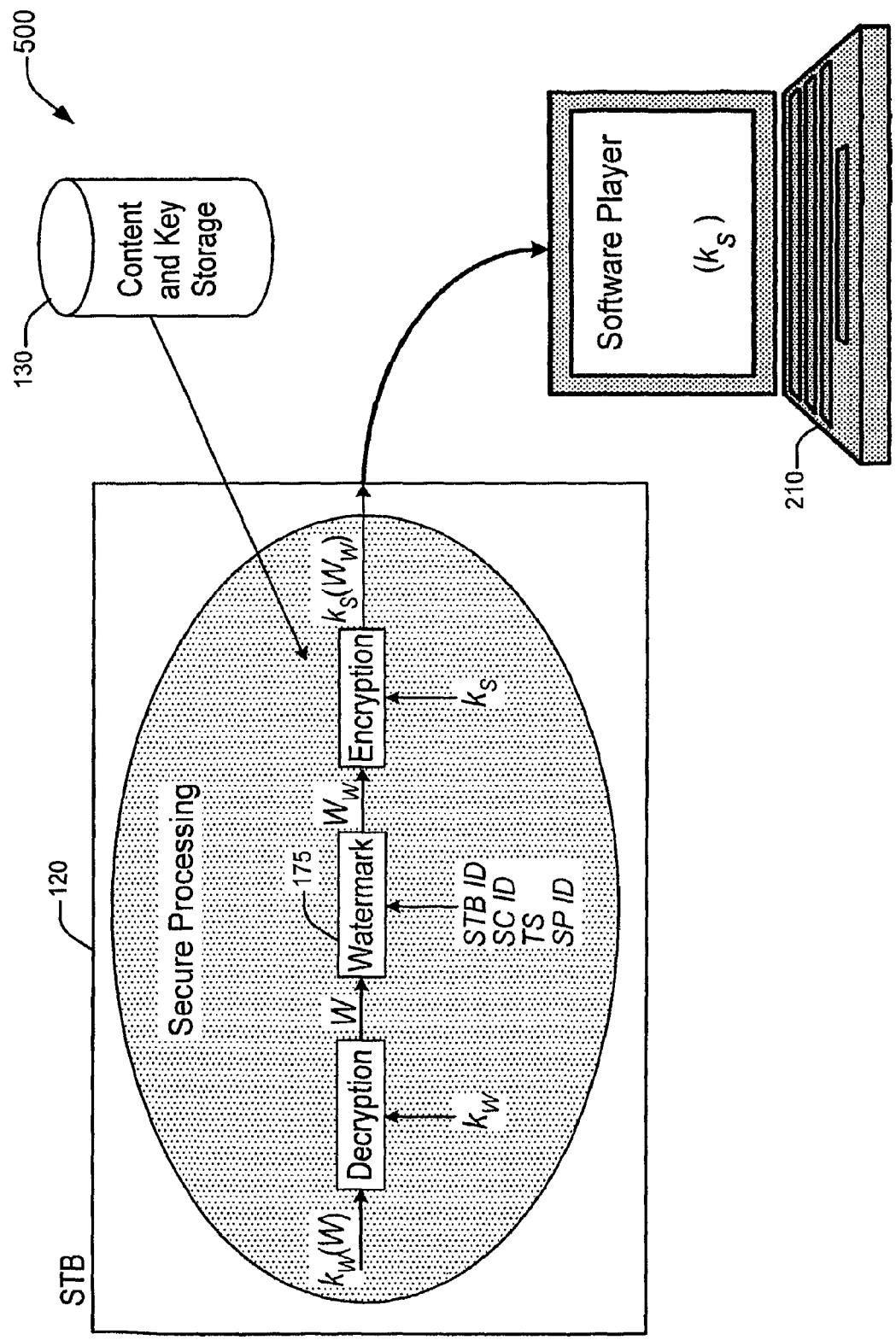
FIG. 5 depicts a high level block diagram of a system for receiving and playing encrypted content including an alternate watermarking method in accordance with an alternate embodiment of the present invention.

As such, in an alternate embodiment of the present invention, the content is not watermarked during storage, but instead, watermarked as they are transferred to the software player. For example, FIG. 5 depicts a high level block diagram of a system for receiving and playing encrypted audiovisual content including an alternate watermarking means in accordance with an alternate embodiment of the present invention. The system 500 of FIG. 5 illustratively includes a content and key storage device 130 and a Set-top Box (STB) 120 as depicted in FIG. 1 and a software player 210 as depicted in FIG. 2. Similar to the embodiment depicted in FIG. 1, received content is stored directly in its encrypted form. Upon request, the content is decrypted and re-encrypted with the session key as before, however in the embodiment of FIG. 5, a watermark is added by the watermarking module 175 to the content. As previously described, the watermark can include a time stamp identifying at least the time of download and, if available from the STB storage, the time of initial storage as is the case in the first watermarking approach. In addition, a unique ID of the software player 210 is now known at the time of watermarking (i.e., because of the digital signature), and as such, information identifying the particular software player 210 can be included in the watermark information.

In one embodiment of the present invention, the watermark is added directly into an MPEG-2 bitstream. The marking process can be real-time for the first watermarking embodiment described with respect to FIG. 4 and can be faster than real-time for the second watermarking embodiment described with respect to FIG. 5. In one embodiment, the watermarking process does not introduce any visible or audible artifacts that would tip off a user of its existence. In addition, the watermark data can be recoverable after resizing to a smaller size, transcoding, and a number of other standard television picture processes including de-interlacing, noise reduction, color adjustment, etc. A watermark detector (not shown) does not have any information included in the embedding process. That is, an embedder (not shown) and detector can share a secret, but the detector will not know, apriori, which embedder was used. Detection is a forensic operation and can be slower than real-time.

Both above described watermarking approaches embed customer identifying information into content that are intended to be viewed and not distributed. If a user obtains piracy software that discovers software player keys and if that user uses that piracy software to make unauthorized copies of works stored on the STB, those copies will contain watermarks with identifying information to identify the location of origin of the pirated content. If any of those copies are distributed (i.e., on a P2P network or on a web site for example), each and every unauthorized copy will contain the necessary forensic information (e.g., watermark and identification information) to identify the original intended recipient of that content. After such discovery, an STB operator can take any remedial action deemed appropriate including but not limited to sending a warning letter, to cancellation of service, to the pursuit of legal remedies and the like.

In accordance with various embodiments of the present invention, an STB includes a private/public key pair. The private key is embedded in the STB and the public key is stored in a secure database by the STB operator. The STB can also include a digital certificate supplied by the STB operator. Subsequently, a customer can contact the STB operator and requests a software player for viewing desired content. The request is accompanied by an STB identifier (this request could be facilitated through the STB). The STB operator recovers the STB public key from the database, creates a digital certificate for the software player, and communicates such information to the customer. Additionally, and as described above, the software player has its own private/public key pair.

As described above, in a first approach, content to be stored locally at the STB is first decrypted, watermarked, and then re-encrypted. The software player initiates a session with the STB and provides its public key. The software player and the STB negotiate a secure channel using their digital certificates, and establish a session key. In the first approach, stored watermarked content is decrypted on the STB and re-encrypted with the session key before being transferred to the software player.

In the second approach, stored content is decrypted on the STB, watermarked, and then re-encrypted with the session key before being communicated to the software player. The software player decrypts the content with the session key and plays the content.

Having described various embodiments for a method, apparatus and system for the secure distribution of content (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for secure distribution of content, comprising:
    decrypting content encrypted using a first key, the first key encrypted with a second key, with a locally stored copy of the second key and a received copy of the first key;
    marking the decrypted content for identification purposes;
    re-encrypting the marked content using the first key;
    establishing a secure communications channel with at least one receiver for generating a unique session key with said at least one receiver;
    encrypting the content intended for said at least one receiver using the unique session key; and
    communicating the encrypted content encrypted using the unique session key to said at least one receiver;
    wherein the communicated encrypted content is decrypted by said at least one receiver using a locally stored copy of the unique session key.

2. The method of claim 1, further comprising:
    storing the marked and re-encrypted content.

3. The method of claim 1, wherein the mark comprises a watermark.

4. The method of claim 1, further comprising:
    storing the distributed content and first key prior to decryption.

5. The method of claim 1, wherein the first key comprises a work key.

6. The method of claim 1, wherein the second key comprises a smart card key.

7. The method of claim 1, wherein the content comprises audiovisual content.

8. An apparatus for secure distribution of content, comprising:
    a secure processing module for encrypting and decrypting content;
    a smart card for locally storing and decrypting encryption keys; and
    a marking module for marking content;
    wherein upon receiving content encrypted with a first key and upon receiving the first key encrypted with a second key, the smart card of the apparatus decrypts the first key using a locally stored copy of the second key, the secure processing module decrypts the received encrypted content using the decrypted first key, the marking module marks the decrypted content for identification purposes and the secure processing module re-encrypts the marked content using the first key; and
    wherein the apparatus:
    establishes a secure communications channel with at least one receiver for generating a unique session key with said at least one receiver;
    encrypts content intended for said at least one receiver using the unique session key; and
    communicates the encrypted content encrypted using the unique session key to said at least one receiver;
    wherein the communicated encrypted content is decrypted by said at least one receiver using a locally stored copy of the unique session key.

9. The apparatus of claim 8, wherein the apparatus receives the unique session key from a content player via a secure channel and wherein the secure processing module encrypts the decrypted content using the unique session key and wherein the apparatus communicates the content encrypted using the unique session key to the content player.

10. The apparatus of claim 9, wherein the content player decrypts the content encrypted via the unique session key using a locally stored copy of the unique session key.

11. A system for secure distribution of content, comprising:
    a content source for distributing content;
    an electronic counter-measure device for encrypting the distributed content using a first key and for encrypting the first key using a second key;
    an apparatus for receiving the content encrypted with a first key and the first key encrypted with a second key, the apparatus including:
        a secure processing module for encrypting and decrypting content;
        a smart card for locally storing and decrypting encryption keys; and
        a marking module for marking content;
    a storage device for storing the received encrypted content and the first key;
    wherein upon receiving content encrypted with the first key and upon receiving the first key encrypted with the second key, the smart card of the apparatus decrypts the first key using a locally stored copy of the second key, the secure processing decrypts the received encrypted content using the decrypted first key, the marking module marks the decrypted content for identification purposes and the secure processing module re-encrypts the marked content using the first key; and wherein the apparatus:
establishes a secure communications channel with at least one content player for generating a unique session key with said at least one content player;
encrypts content intended for said at least one content player using the unique session key; and
communicates the encrypted content encrypted using the unique session key to said at least one content player;
wherein the communicated encrypted content is decrypted by said at least one content player using a locally stored copy of the unique session key.

12. The system of claim 11, wherein the marked, re-encrypted content is stored in the storage device.

13. The system of claim 11, further comprising:
a content player for communicating the unique session key to the apparatus via a secure channel;
wherein the apparatus encrypts the decrypted content using the unique session key and communicates the content encrypted using the unique session key to the content player and the content player decrypts the content encrypted via the unique session key using a locally stored copy of the unique session key.

* * * * *